US008379848B2

(12) United States Patent
Muise et al.

(10) Patent No.: US 8,379,848 B2
(45) Date of Patent: Feb. 19, 2013

(54) METHOD OF PROVIDING A PORTABLE TRUE RANDOM NUMBER GENERATOR BASED ON THE MICROSTRUCTURE AND NOISE FOUND IN DIGITAL IMAGES

(75) Inventors: Joseph Gerard Muise, Grand Barachois (CA); Marie Lise Lavoie, Grand Barachois (CA)

(73) Assignee: Cape Light Institute, Inc., New Brunswick (CA)

( * ) Notice: Subject to any disclaimer, the term of this patent is extended or adjusted under 35 U.S.C. 154(b) by 0 days.

(21) Appl. No.: 13/177,883

(22) Filed: Jul. 7, 2011

(65) Prior Publication Data

US 2013/0010952 A1    Jan. 10, 2013

(51) Int. Cl.
*H04L 9/00* (2006.01)
*G06F 21/00* (2006.01)
(52) U.S. Cl. .......................................... 380/44; 708/255
(58) Field of Classification Search .......................... None
See application file for complete search history.

(56) References Cited

U.S. PATENT DOCUMENTS

| 6,215,874 | B1 | 4/2001 | Borza et al. |
| 7,020,283 | B1 | 3/2006 | Wada et al. |
| 7,626,623 | B2 | 12/2009 | Shirakawa |
| 2005/0190913 | A1* | 9/2005 | Wada et al. ..................... 380/44 |
| 2009/0262928 | A1 | 10/2009 | Busari |

FOREIGN PATENT DOCUMENTS

JP    2005175546    6/2005

OTHER PUBLICATIONS

Wong Siaw Lang, Crytographic Key From Webcam Image, International Journal of Cryptology Research, 2009, p. 115-127.

* cited by examiner

*Primary Examiner* — Gilberto Barron, Jr.
*Assistant Examiner* — Izunna Okeke
(74) *Attorney, Agent, or Firm* — Gold & Rizvi, P.A.; Glenn E. Gold

(57) ABSTRACT

A method of providing a portable true random number generator based on the microstructure and noise found in digital images is claimed and disclosed. Using the lowest significant bits of digitized images, strings of binary data are extracted. These raw strings are shown to pass the DIEHARD, NIST, and ENT tests for randomness for a robust selection of natural images. This information is available to, and may be processed by off-the-shelf technology including smartphones or other embedded devices without undue constraints on physical and environmental parameters. The method represents a significantly improved portable means of random number generation for all security, cryptographic, entertainment and PSI applications.

14 Claims, 9 Drawing Sheets

METHOD OF PROVIDING A PORTABLE TRUE RANDOM NUMBER GENERATOR BASED ON THE MICROSTRUCTURE AND NOISE FOUND IN DIGITAL IMAGES

FIELD OF THE INVENTION

The present disclosure generally relates to a portable true random number generator. More particularly, the present disclosure relates to a method of providing a portable true random number generator that is based on the microstructure and noise found in digital images.

BACKGROUND OF THE INVENTION

The present invention provides a front end, portable true random number generator (TRNG) based on a physical source. Digital images of a broad classification are processed with minimal post-processing which pass DIEHARD, NIST, and ENT protocol tests.

Considerable effort has been afforded in the history of mankind to generate random numbers or their derivatives. Card shuffling, random coin tosses, drawing of various lengths of straws, tumbling objects, spinning wheels and other means have been used to avoid biases in decision making processes. More modern approaches to random number generation may be classified by the methods used to obtain them. Deterministic pseudorandom number generation has been often used as the result of increased availability and power of computers and microcomputers. Physical random number generators have been developed using quantum noise from radioactive decay sources, electronic noise, thermal noise from resistors, avalanche noise from reversed biased diodes, and state interruption of high-speed oscillators by external events.

Two interrelated concerns are of prime importance in the generation of random sequences. First, there should be no bias in frequency, periodicity and locality. Second, the sequences should not be predictable and should be impervious to discovery. The first issue pertains primarily to the use of random numbers in simulation, experimental design and assignment applications. The second concern of resistance to discovery is important in all cryptographic applications and security systems.

The main problems with pseudorandom generators are the necessity to randomly seed the process, the limited cycle period before repetition and the quality of the sequences. Good physical systems appear to be more robust than pseudorandom or mathematically based procedures. The problem with physical systems is often their complexity and portability. Hybrid systems are sometimes used where a physical source generates a finite length random seed for a pseudorandom number generator, which greatly increases the rate of random number generation.

One physical source of random noise is the digitization of images from a chaotic source such as digital images or videos from scenes depicting continuous flow in an embodiment such as a lava lamp. LavaRand was issued as U.S. Pat. No. 5,732,138 to Noll, Mende, and Sisodiya on Mar. 28, 1998. This method is slow and cumbersome and is used primarily to seed a pseudorandom number generator. A modification of this system named, LavaRnd, by Noll and Cooper improves on the speed of LavaRand by using a digitized image from a webcam. However, this implementation depends highly on ad hoc conditions such as complete darkness, stable high ambient temperature and amplification parameters to maximize noise.

The present invention obviates the physical limitations of the prior art by requiring few special environmental conditions. It is extremely robust in the categories of images chosen, is undiscoverable and is embeddable in standalone devices. The true random number generator of the present invention isolates random noise associated with the least significant bits in the digital samples. The invention thus uses widely available off-the-shelf hardware such as smartphones, cameras, scanners, single lens photo transducers and others, which are extensibly portable. A preferred embodiment of the present invention is any type of smartphone or general computing device with access to digitized images. Users of the invention have an easily accessible user-defined entropy pool.

The preferred present implementation using 8-bit digital samples for each color considers only the least significant bit (LSB) of one or more of the color guns in weighted and non-weighted functions. Prior applications that have used digitized images have assumed that the raw output is not random but needs substantial corrective measures. In part, the difficulty with the preceding art is the use of all the information in the eight bits or even n-bit patterns associated with each pixel in an image to generate random seeds. In the analysis of random informational changes in chaotic sources, higher bits would be most likely not to change in subsequent spatial or temporal samples. As an example, triple 8-bit pixels (24 bit RGB) sampled a first time may be inter-related with a second sample. This interdependence would even be present within a pixel sample from the real world. More green may mean less red and blue or any possible combinations thereof. Tests conducted by the Applicant show that concatenating the stream of lowest significant bits independently from each of the guns does not meet the requirements of a TRNG.

Nielsen, in his 1998 U.S. Pat. No. 5,774,549, has considered the use of the information contained in the LSB of digital videos for random seed generation akin to prior art in the design of hardware generators such as used by Wilber, U.S. Pat. No. 6,764,364, but has not considered or analyzed this source as a TRNG. Lang et al. (2009) have used the LSB from digitized images to generate a stream of random bits. However their method requires a raw image that crucially involves the inhibition of lossy compression in a webcam, which restricts its use with modern technology.

A novel feature of this invention is to extract microstructure noise and errors inherent in the digitizing and quantization process of images to generate a stream of true random bits. The inventive process can use raw images or lossy compressed images such as JPEG. The results show that, given a reasonably micro-structured pattern such as a wall, popcorn ceiling, a rock formation, ocean waves, that the stream of bits generated from the state of the least significant bit, represents a true random sequence. The rate of generation of the random bits is substantial. As an example, the rate for a 5 megabyte camera such as the IPHONE® 4 is 0.25 to 1.00 proportion of the pixel capacity of the digitized image, e.g. 1-5 megabits per image, which renders unnecessary the need for subsequent processing such as seeding of a deterministic pseudorandom number generator. Accordingly, this process obviates prior art difficulties by retaining the most important contributors of random noise, the microstructure of the images and quantization noise in the lowest significant bits of the digitized sample.

SUMMARY OF THE INVENTION

The basic inventive concept provides a true random number generator based on the microstructure and noise found in digital images.

A first aspect of the present invention provides a method of generating true random numbers, said method comprising the steps of:

choosing a source image and category from a naturally occurring scene by a user;

digitizing the source image with an encoder to create a digitized image;

extracting least significant bits of each pixel of the digitized image;

processing the least significant bits of each pixel to create a random bit stream;

driving applications with the newly created random bit stream; and wherein, the generation of the true random numbers are based on a microstructure of the image and digitization and quantization error found in the least significant bit of the pixels.

In a second aspect, the method of generating true random numbers wherein the source image may be a static still or dynamic movie video.

In yet another aspect, the method of generating true random numbers includes the choice of categories of images being robust based on DIEHARD, NIST, and ENT criteria.

In yet another aspect, the method of generating true random numbers further provides possibilities of categories of natural source images that include homogeneously painted walls, popcorn ceilings, carpet fabrics, paving stones, architectural granite columns, ancient ruins, and ocean waves.

In yet another aspect, the method of generating true random numbers further includes applying image processing criteria in order to ensure the appropriateness of the images chosen In yet another aspect, the method of generating true random numbers provides digital correction of the raw bit stream.

In yet another aspect, the method of generating true random numbers also provides applying a von Neumann algorithm to balance the bit stream for frequency counts In yet another aspect, the method of generating true random numbers wherein the random number generation can be influenced by user intervention and observation.

In yet another aspect, the method of generating true random numbers wherein the random number generation may be used to generate a random seed for a deterministic pseudo-random number generator In yet another aspect, the method of generating true random numbers wherein the encoder provides the function of creating image type micro-structures.

In yet another aspect, the method of generating true random numbers wherein the encoder may be an off-the-shelf portable device a computer, embedded device or stand-alone unit.

In yet another aspect, the method of generating true random numbers wherein the random bit stream further comprises:

driving an application used for entertainment and game development; and wherein, the user becomes part of the random process by choosing the image source and image category; and wherein, the choosing acts as an incentive to enhance the entertainment of game playing.

In yet another aspect, the method of generating true random numbers wherein the random bit stream includes driving the transmission of secure personal and commercial information using NIST defined security protocols such as MD5, SHA-1 and SHA-2.

In yet another aspect, the method of generating true random numbers wherein the security applications may further include those which utilize hash functions.

In yet another aspect, the method of generating true random numbers wherein weighted functions of the pixel data, ranging from the selection of at least one color gun to weighted luminance functions may be calculated in order to extract the least significant bit of the at least one color gun.

In yet another aspect, the method of generating true random numbers wherein the structure of the image data further comprises:

providing an n-dimensional data structure in the form of a cube; and sampling x and y image pixels across time (t).

These and other advantages of the invention will be further understood and appreciated by those skilled in the art by reference to the following written specification, claims and appended drawings.

BRIEF DESCRIPTION OF THE DRAWINGS

The invention will now be described, by way of example, with reference to the accompanying drawings, in which.

Like reference numerals refer to like parts throughout the various views of the drawings.

DETAILED DESCRIPTION OF THE INVENTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper," "lower," "left," "rear," "right," "front," "vertical," "horizontal," and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 1:
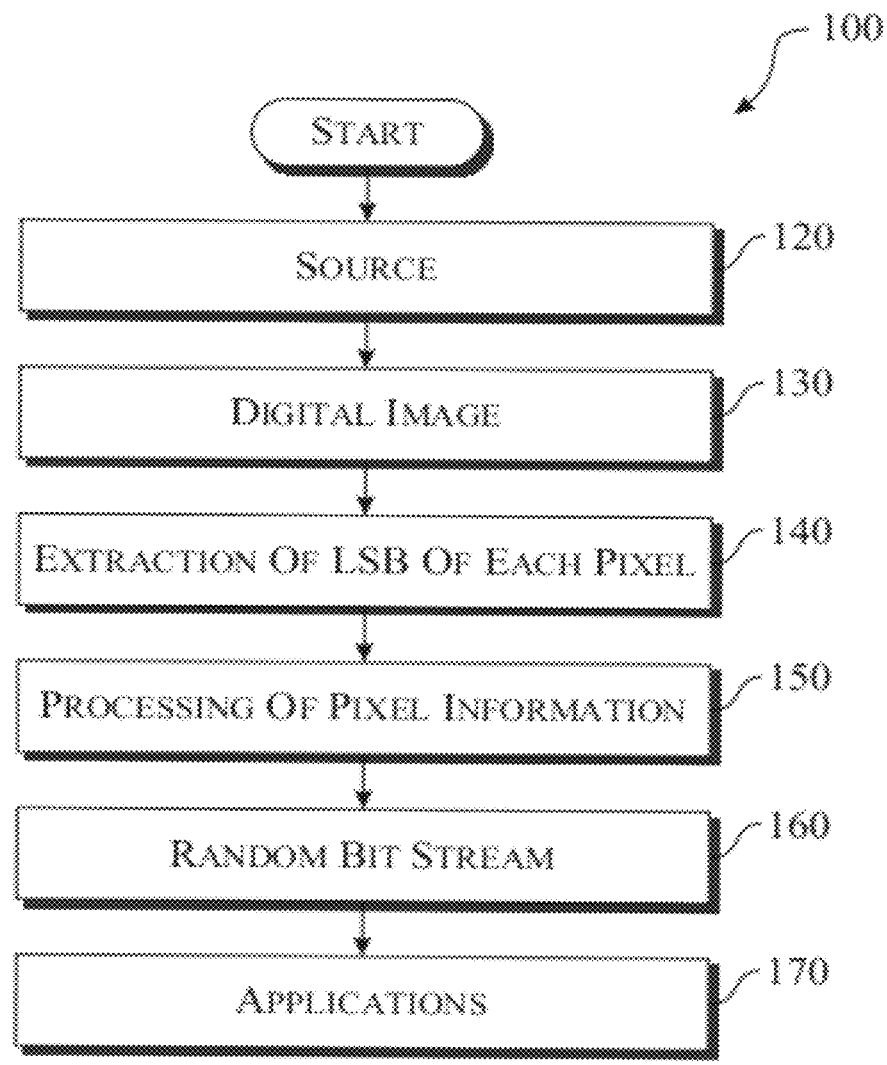
FIG. 1 presents an exemplary flow diagram of a portable true random number generator that is based on the microstructure and noise found in digital images in accordance with one embodiment of the invention, the flow diagram presenting the method steps required.

A general flow diagram of method steps required to provide a portable true random number generator (TRNG) based on the microstructure and noise found in digital images 100 is illustrated in FIG. 1. The portable true random number generator 100 first provides raw or source images 120 of natural occurring scenes that are chosen by a user. The source images 120 chosen may be static (stills) or dynamic (movies) and the process is quite robust as to the category of images chosen. Then, the source images 120 are digitized to create digital images 130. Least significant bits (LSB) of each pixel 140 of the digitized images 130 are subsequently extracted. Information regarding each extracted LSB of each pixel 140 is processed 150. Consequently, the processed information 150 creates a random bit stream 160. Finally, the random bit stream 160 is used to drive various applications 170. A detailed description of the method for providing the portable true random number generator based on the microstructure and noise found in digital images 100 will henceforth be disclosed.

Figure 2:
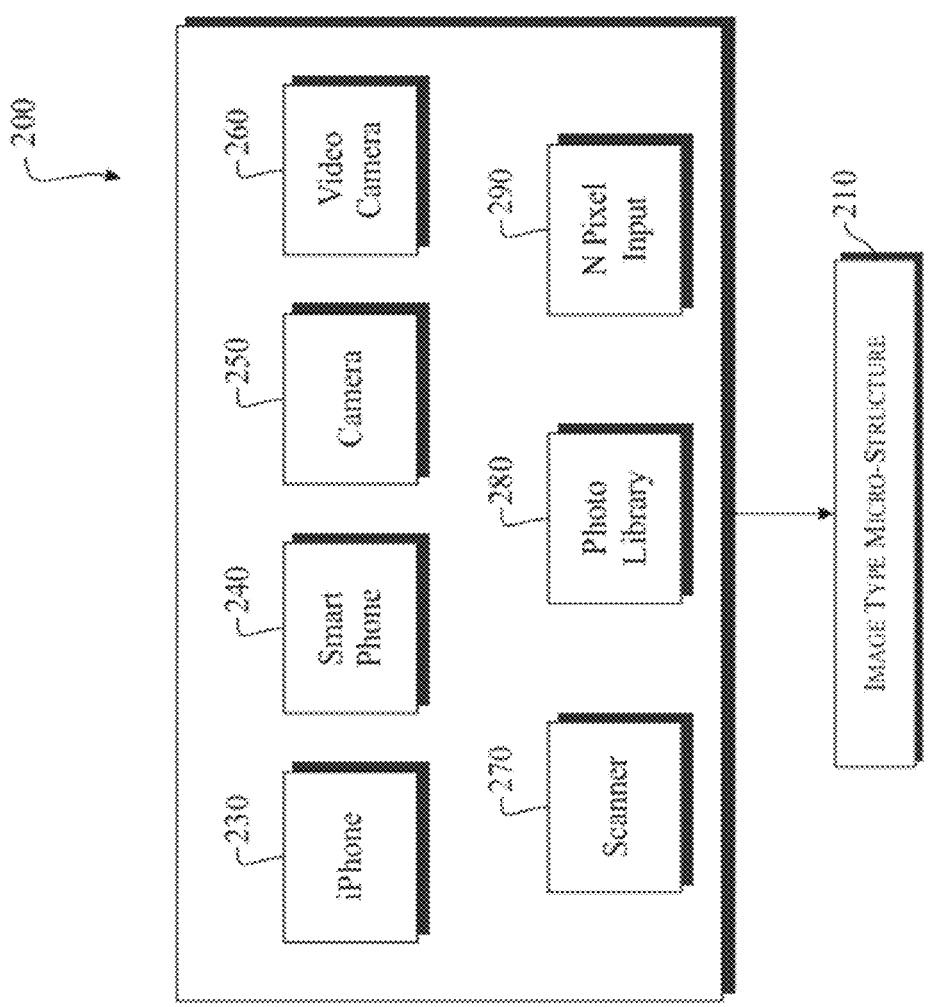
FIG. 2 presents a block diagram of digital image encoders and image types originally introduced in FIG. 1, the diagram presenting the various possibilities that could be employed.

An exemplary step of the present method entails providing an encoder 200 to acquire digitized images 130 from the source image 120, the potential encoders illustrated in FIG. 2. The encoder device 200 is used to create an image type micro-structure 210. The potential encoder devices 200 include, but are not limited to, an IPhone 230, a Smart Phone 240, a camera 250, a video camera 260, a scanner 270 and an N Pixel Input 290. Although it is possible to use several of these devices, the preferred device of the present invention would be a portable embodiment, such as the generic smartphone 240 with a camera and possibly with Internet access. However, this does not exclude general computing and other embedded devices. The preferred input would be a still image, but does not exclude video sequences from a video camera 260. For massive quantities of random numbers, a pre-installed photo library 280 of non-sequential and independent photos could be a preferred choice.

Figure 3:
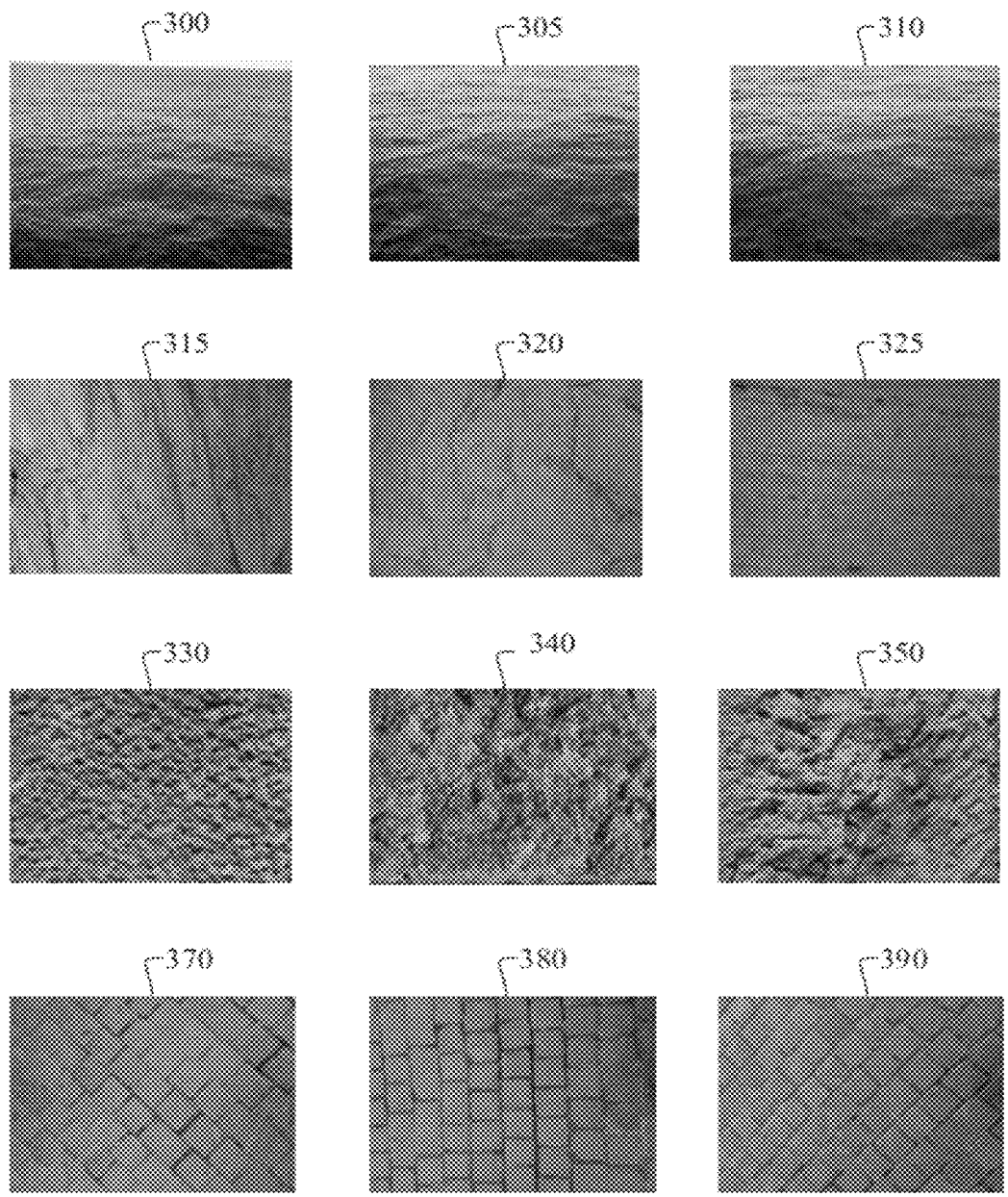
FIG. 3 presents photos of images tested by the present invention using DIEHARD, NIST, and ENT protocols originally introduced in FIG. 1, the photos presenting some non-exhaustive categories of images.
Figure 4:
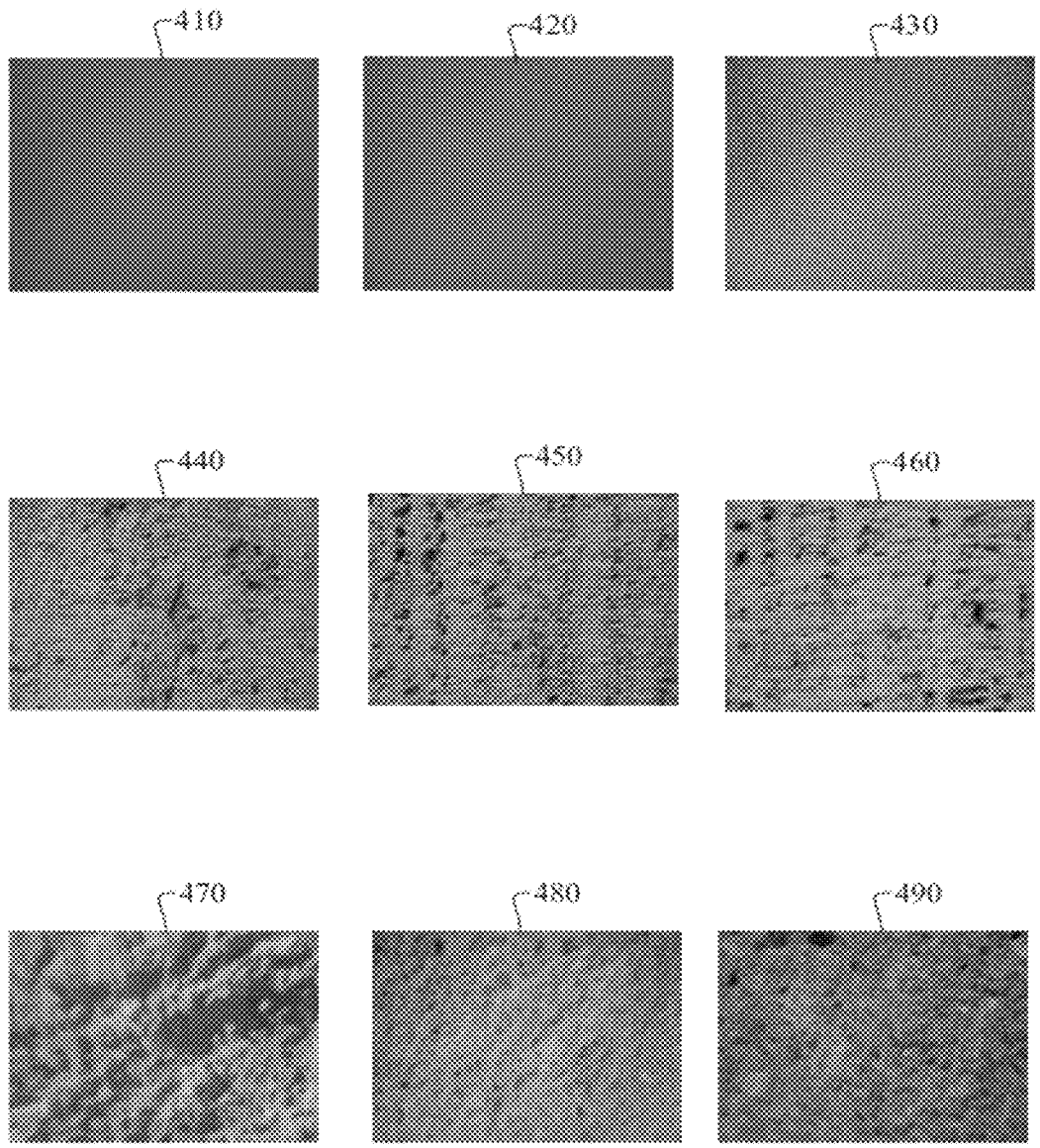
FIG. 4 presents additional photos of images tested by the present invention using DIEHARD, NIST, and ENT protocols originally introduced in FIG. 1, the photos presenting some further non-exhaustive categories of images.

Exemplary photos of raw images and the types of suggested microstructures 210 required to achieve a true random bit stream 160 are illustrated in FIGS. 3-4. A broad selection of microstructured images were chosen and tested. The choice of the image sources were not based on sophisticated mathematical algorithms or even precarious adjustment and consideration of environmental parameters. The digital photos of the present invention were taken either in full sunlight, non-controlled indoor lighting or shade without prejudice. A goal of the invention is to provide user accessible source images 120 that are based on common household environmental elements such as homogeneously painted walls 410, popcorn ceilings 420 and carpet fabrics 430. Other natural structures such as paving stones 370, 380 and 390, architectural granite columns 440, 450, 460, 470, 480 and 490, ancient ruins 315, 320, 325, 330, 340 and 350 and ocean waves 300, 305 and 310 are suitable choices. As such, the database of source images spans a variety of physical settings.

Figure 5:
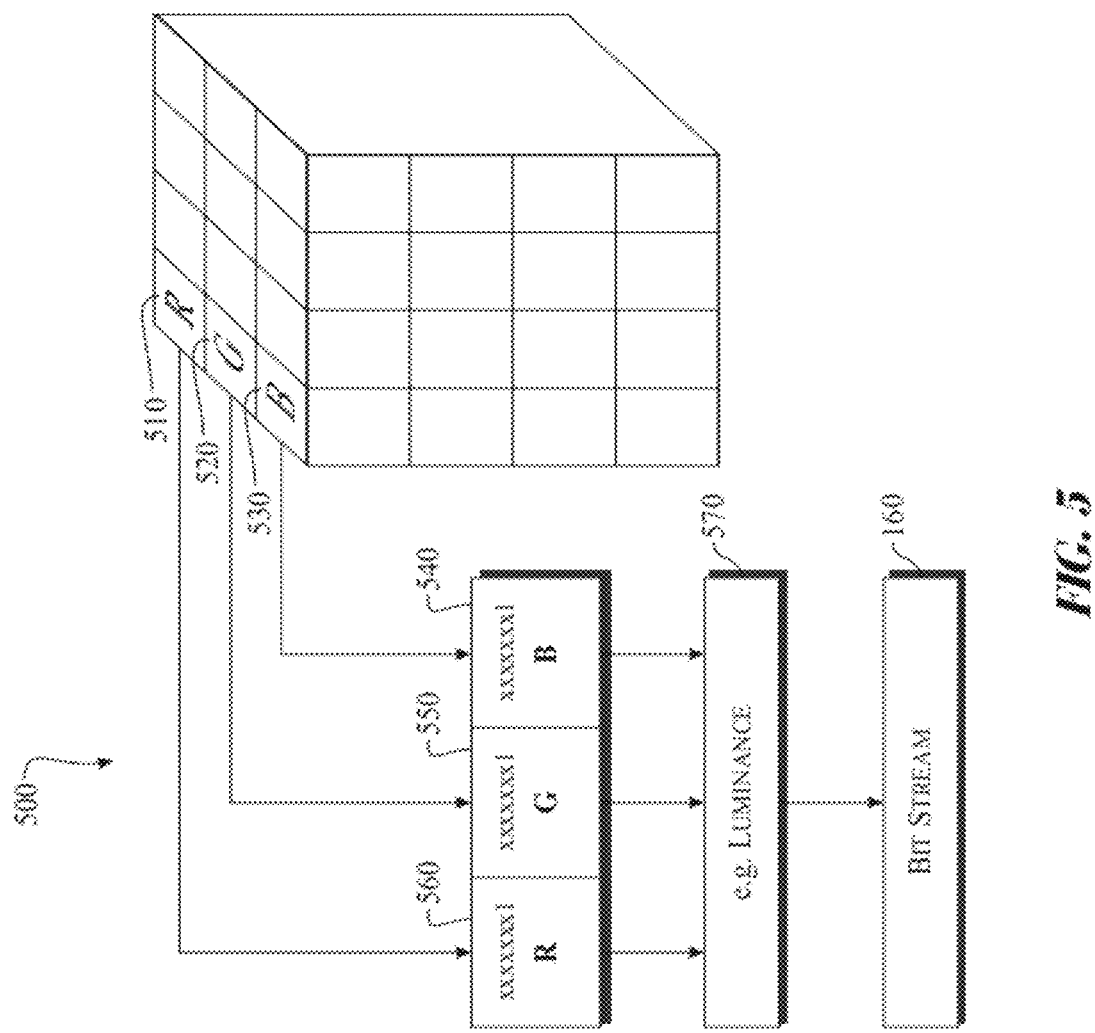
FIG. 5 presents a block diagram of binary information being extracted originally introduced in FIG. 1, the diagram presenting extraction information from the least significant bit of a pixel.

An exemplary step of the present method showing the process once the image is chosen is illustrated in FIG. 5. Once the image is chosen, weighted functions of the pixel data Red/xxxxxxx1 560, Green/xxxxxxx1 550 and/or Blue/xxxxxxx1 540, ranging from the selection of one or more color guns Red 510, Green 520 and/or Blue 530 to weighted human luminance functions 570, or other, may be calculated. Following this, the LSB of the weighted pixel Red/xxxxxxx1 560, Green/xxxxxxx1 550 and/or Blue/xxxxxxx1 540 is extracted and placed in the bit stream 160. The preferred present implementation using 8-bit digital samples for each color considers only the least significant bit (LSB) of one or more of the color guns in weighted and non-weighted functions. The analyses have shown that this bit stream passes DIEHARD, NIST and ENT criteria for the category and instances of the chosen images.

Some instances of selected digital images may not conform to these ideal suited conditions. Simple inline calculation of elementary image properties such as thresholding lower and higher limits for pixel values, or, the first moments of mean, variance, skewness and optionally higher moments of the pixel data as a function of the color guns would classify the image as acceptable or not for further processing. Weighting each gun according to, for example, a luminance function of (0.30) Red 560, (0.59) Green 550 and (0.11) Blue 540 for human perception reduces extreme values of selected color guns. Analyses show that this transformation does meet the DIEHARD, NIST, and ENT statistical requirements of a true random number generator for very broad categories of images, which are readily available to the user.

Images may be tested for appropriateness especially since extremely bright and dim images or segments could lead to biases in the random sequences. Logical functions such as XORing the LSB of the color guns may also lead to conditions of extreme bias in the bit stream 160. For example, saturating the R, G, and B guns with a very bright scene or segments of a very bright image leads to modal values associated with the maximum digital representation of the values. In other words, most 8-bit values would be, for instance, 255. Most LSB's would have the value of 1. The same argument holds for modal pixel values in very dim images close to zero, where most LSBs would have the value 0. Elementary image parameters such as thresholding minimum and maximum range values, mean and variance of the pixel data as a function of color or weighted color pixels could easily be calculated inline to increase confidence in the randomness of the image. Camera parameters may also be dynamically adjusted to gather data with appropriate luminance mean and spread or contrast functions. Appropriate alerts could be transmitted to the user (device or observer) based on these calculations.

Figure 6:
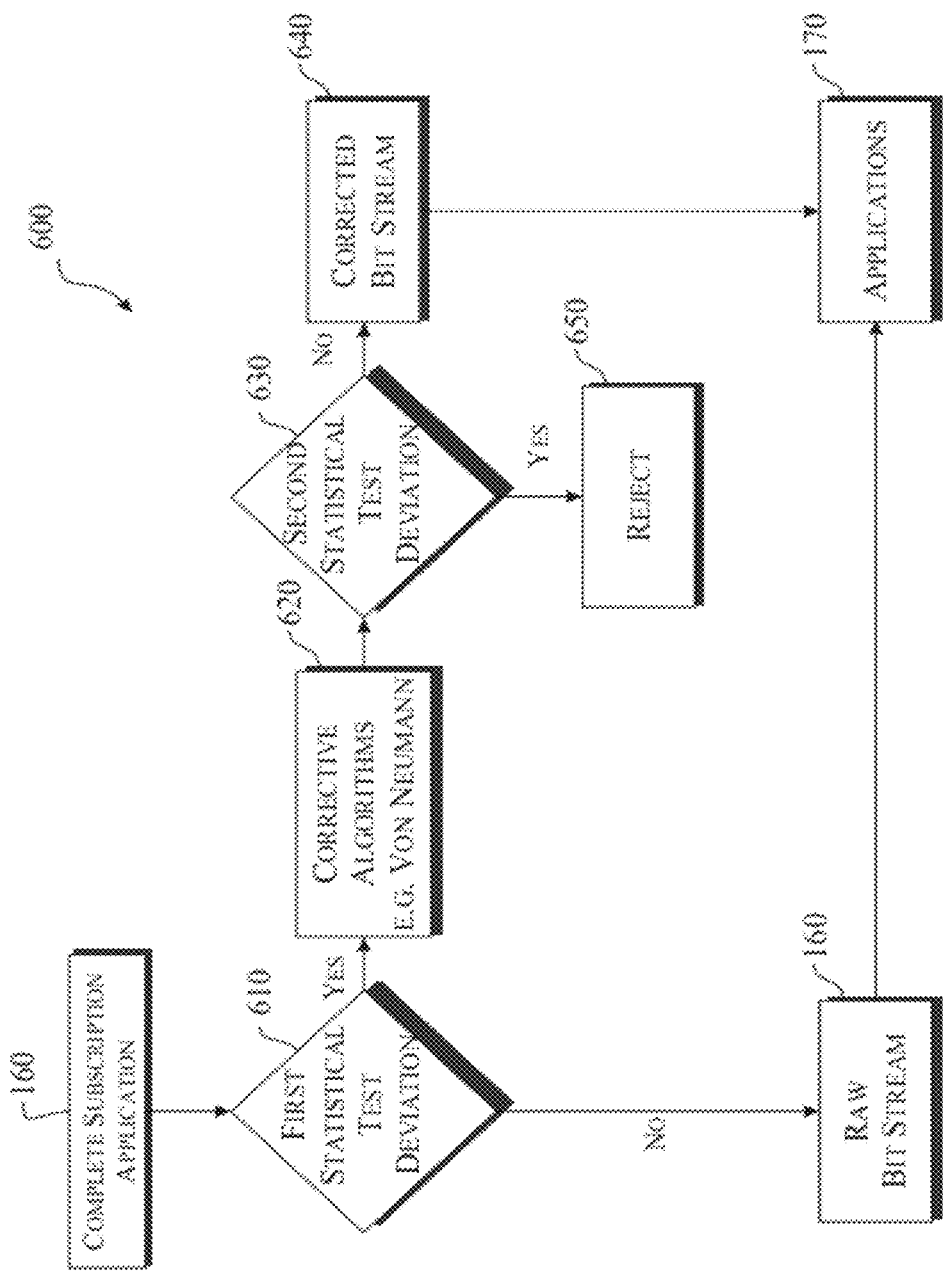
FIG. 6 presents a flow diagram of the processing of the binary random bit stream originally introduced in FIG. 1, the flow diagram presenting possible bias correctors.

This bit stream 160 or portions thereof may be subjected to an inline statistical analysis to ensure entropy quality. An exemplary flow diagram 600 of the steps to process these potentially non-ideal images through statistical testing 610 and corrective algorithms 620 are illustrated in FIG. 6. Consequently, the raw bit 160 stream is first statistically tested for deviation 610. Simple tests such as Chi-Square ($x^2$) and short sequence NIST tests are examples of many frequency and serial tests, which may be employed efficiently in real time, without undue processing overhead to assure the quality of the random stream. If the first statistical tests 610 reveal significant deviations, traditional corrective measures such as the von Neumann algorithm 620 shown in table 1 below may be applied to balance the bit stream for frequency counts. After the corrective algorithm 620 is applied, the resultant bit stream is statistically tested a second time 630. If there is still deviation in the bit stream 160, the data is rejected 650 and will send a signal to the smart device not to be used. If, there is no deviation after the second statistical deviation test 630 the corrected bit stream data 640 can be used for applications 170.

If the first statistical deviation tests 610 show no significant deviations, then the raw bit stream 160 may automatically be used for applications 170.

TABLE 1

Von Neumann Truth Table

| Input 1 | Input 2 | Output |
|---------|---------|--------|
| 0 | 0 | None |
| 0 | 1 | 0 |
| 1 | 0 | 1 |
| 1 | 1 | None |

Figure 7:
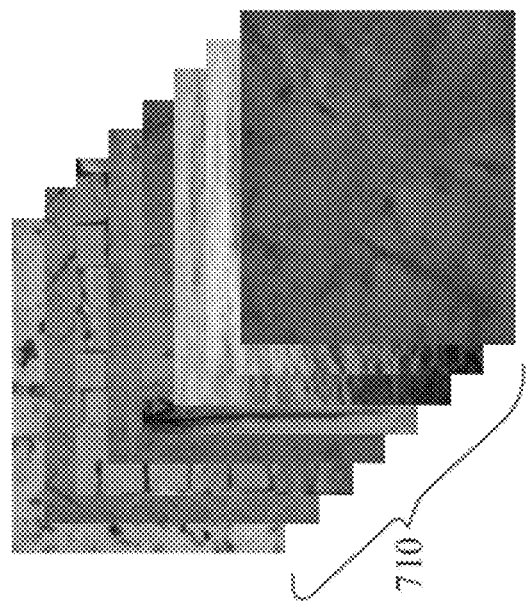
FIG. 7 presents a series of photos that depict a multidimensional array of raw digital images associated with their transformation.
Figure 7:
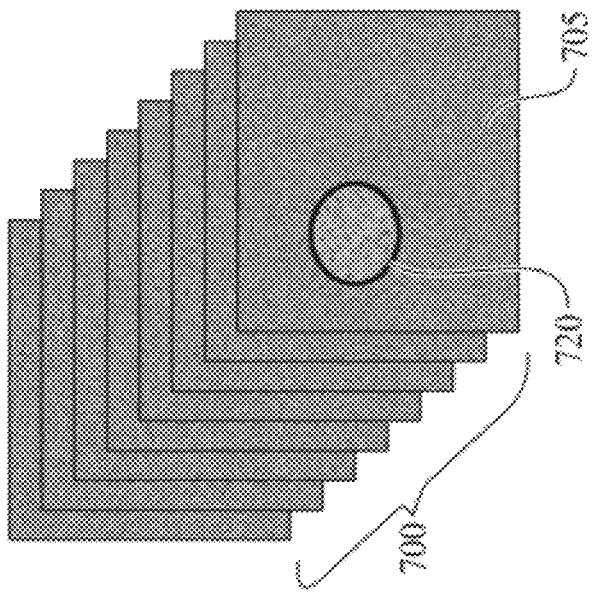

An important distinction is that the sampled stream of bits 160 need not necessarily be sequentially linear. Exemplary photos of images 700, 710 that don't necessarily provide sequentially linear streams of bits are illustrated in FIG. 7. The pixel stream as represented here is read from an image much like reading from a book, each new line from left-to-right, which simplifies the description of the algorithm. However, the structure of the data has at least two-dimensional extent, x and y as encircled in a last image 705 of photos 700. In other words, the pixels may be read in any predefined order, e.g. book-reversed order, knight's tour, polar coordinates, even randomly shuffled order as seen in photos 710 with the sequences defined iteratively from the image or other source. To clarify, a magnified section of the texture is illustrated in elliptical section 720 of FIG. 7.

Furthermore, the structure of the data may be considered n-dimensional, for example, as a cube or hypercube with samples retrieved sequentially from n-dimensional space. A simple example of a three dimensional structure would be a pre-stored video, with x, y image pixels sampled across time (t). Another example may be x, y, z, u sampling where z would relate to changes in categories of images and u would indicate instances of the categories. Judicious choices of multidimensional sampling procedures would permit the reuse of the same image database without appreciable loss of entropy and would increase resistance to predictability.

Figure 8:
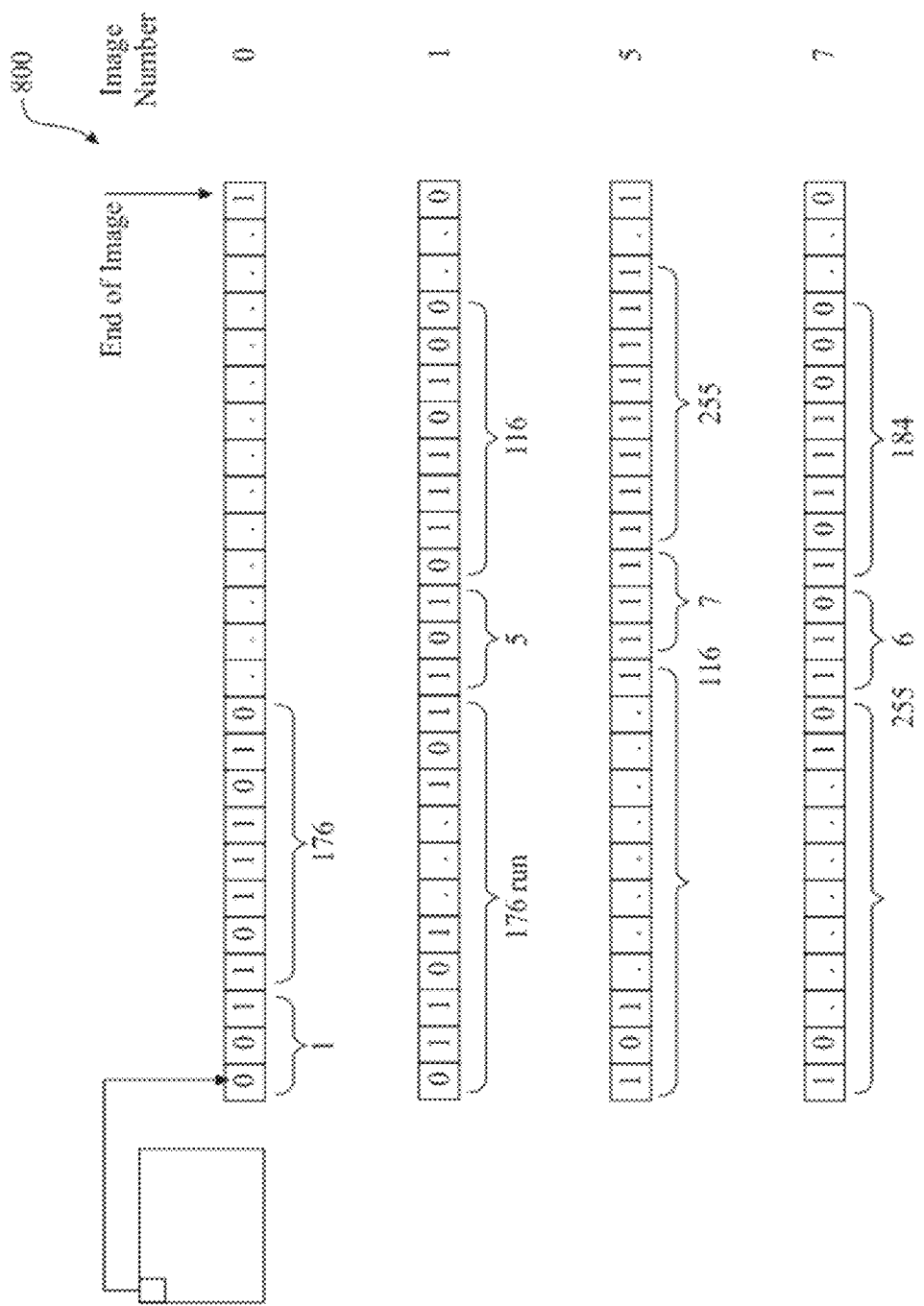
FIG. 8 shows an example of an algorithm that can be used to enhance the randomness and the unpredictability of the bit stream.

An exemplary simplified example of a non-inclusive sampling algorithm 800 to increase resistance to discovery is illustrated in FIG. 8. Assume that there is a stack of $2^n$ images from which to sample. For convenience, we assume a power of 3, which represents a total of 8 images. By choosing an arbitrary image and pixel coordinate as a starting point, let the next $2^n$ (8) binary values of the LSB of pixels define a value from 0-7, which defines the next image to be processed. We define the next $2^{(n2)}$ bits in the stream as the run length associated with the sample of random binary number. For convenience (n2) may take the value of 8, which represents potentially 256 values (0-255). The next 256 acceptable LSBs of the processed pixels represent this portion of the random bit stream. The next 3 processed pixels define the next image to be processed.

Appropriate pointers are kept for each image to avoid collision and to indicate data depletion. This algorithm could be applied to raw image data or compressed, byte-packed, pre-processed image data. The advantage of the latter would be a considerable reduction in storage by a factor of 8 with minimal additional processing overhead, which would be appropriate for lower speed and restricted memory devices such as smartphones and embedded devices. As such, many algorithms are possible which traverse multidimensional space efficiently without collision.

EXAMPLES OF INTENDED USE

Three prototypical examples of intended applications are presented. They are presented as non-exhaustive categories. The underlying principle involved in all the applications is a readily accessible, non-predictable, local source of entropy for the computing device. This accessibility opens the possibility to a host of applications in the field relating to security, PSI, entertainment, and gaming applications.

Example 1

The present invention, using stringent default parameters may be used in security applications as a frontend portable TRNG. To enhance its applicability, traditional post-processing for random seed generation and hash codes may be the preferred implementation. Applications abound in the processing of encoded and encrypted data streams associated with the transmission of secure personal and commercial information using NIST defined security protocols such as MD5, SHA-1 and SHA-2.

Example 2

User-defined local entropy may be used to replace traditional software pseudorandom generators for entertainment and gaming purposes. Most current game technologies requiring a random number generator use a seeded deterministic pseudorandom generator. The main feature and attraction of the present method is that the observer may choose a private and personal random source, which may act as an incentive in game playing and entertainment. One can only imagine the difference in acquiring dichotomous Yes-No or categorical answers to questions based on one's own skin's arm texture, the office or school partition wall, or even from an image of the face of a friend. A simulated game of (s)he loves me, (s)he loves me not takes on a whole new feel and texture.

Non-limiting mundane examples such as generation of lottery numbers, fortune telling, random and quantum decision making, animated "(s)he loves me, loves me not" games, card deck shuffling, game simulation are but a few examples of the method's applicability.

Example 3

Since observer intervention can become an integral part of the random number generation process, application to parapsychological phenomena in the general area of influences of the mind on physical phenomena becomes possible for research and entertainment purposes. The basic principle is for the observer to be able to bias a TRNG which may be used to elicit a detectable change in a feedback device capable of being captured by the human senses, e.g. visual, auditory, tactile and chemical feedback. To clarify the intended use of the invention in such a field, a brief introduction follows.

The concept of observer intervention and its influence in hardware random number generation is well documented. Essentially, analyses have shown that the observer appears to be able to bias TRNG with mental concentration with statistical significance independently of time and space. This concept addresses known and unknown phenomena associated with observer effects in Quantum Mechanics. An objective of the present invention is to maximize the possibility of observer influence on a TRNG by their choices. Previous research has used primarily physical devices with high-speed oscillators that are interrupted by physical events associated with thermal noise, radioactive decay or even key presses or mouse movements by an observer as in U.S. Patent Application 2009/0265112.

Figure 9:
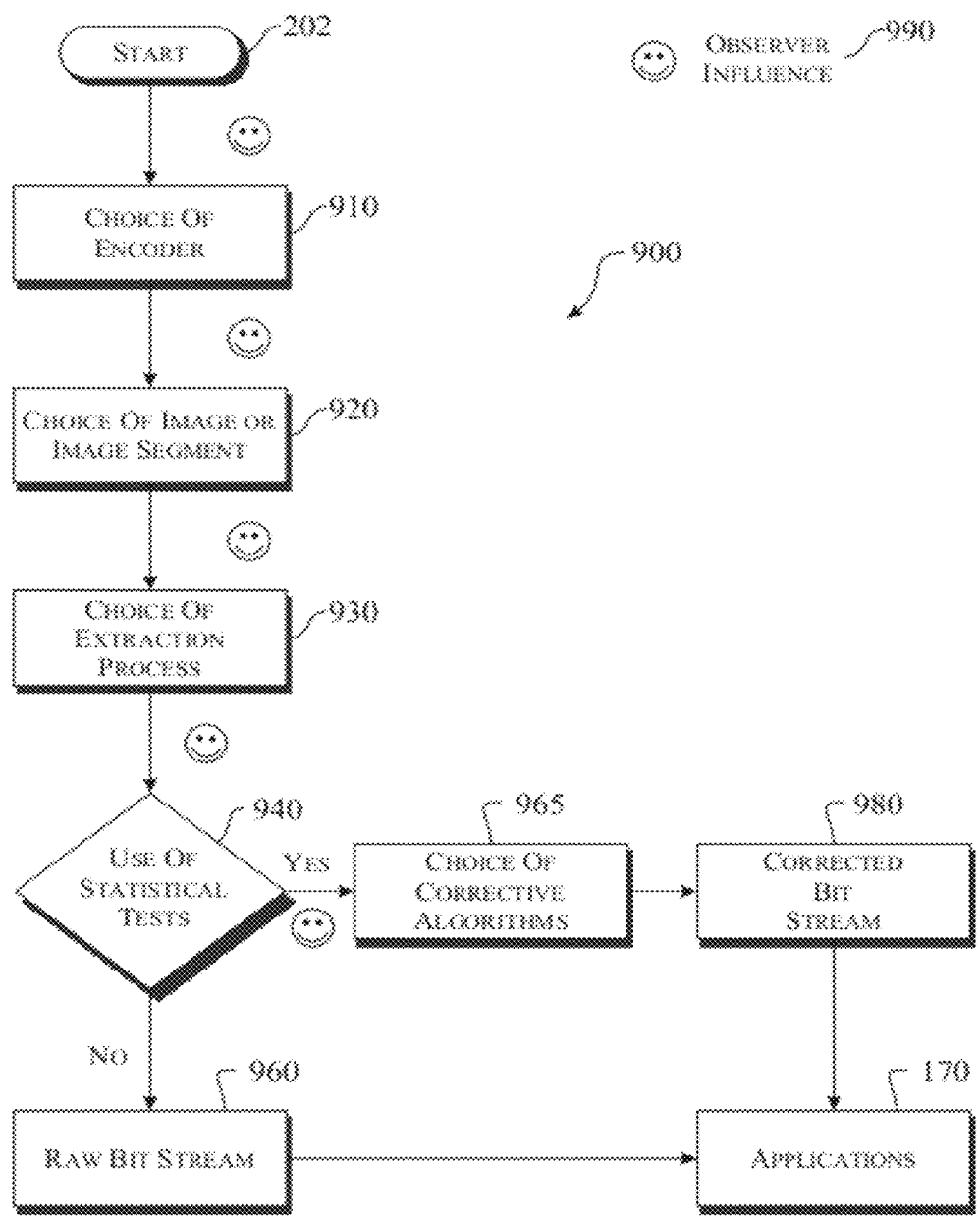
FIG. 9 presents a flow diagram that demonstrates the random sequence obtained from image space with optional decision points for processing based on observer intervention and optional statistical criteria.

The present invention allows for human intervention at multiple stages. An exemplary flow diagram 900 of the various points where an observer's choice can maximize influence 990 over a TRNG is illustrated in FIG. 9. The choice of image encoder 910, image category or image segment 920, extraction process/color gun or weighted options 930, use of statistical tests 940, raw bit streams 960 or corrected streams 980 by the use of algorithms 965, length of random stream (not shown), direction of bias (not shown), are all observer influence 990 dependent. The invention may be used for research purposes, or simply as an entertainment device for decision making.

Since many modifications, variations, and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claims and their legal equivalence.

We claim:

1. A method of generating true random numbers, said method comprising the steps of:
   choosing a source image and category from a naturally occurring scene by a user;
   digitizing the source image with an encoder to create a digitized image;
   extracting least significant bits of each pixel of the digitized image;
   processing the least significant bits of each pixel to create a random bit stream;
   driving applications with the newly created random bit stream; and wherein
   the generation of the true random numbers are based on a microstructure of the image and digitization and quantization error found in the least significant bit of the pixels,
   wherein the categories of natural source images comprise at least one of: homogeneously painted walls, popcorn ceilings, carpet fabrics, paving stones, architectural granite columns, ancient ruins, and ocean waves,
   wherein weighted functions of the pixel data, ranging from the selection of at least one color gun to weighted luminance functions are calculated in order to extract the least significant bit of the at least one color gun.

2. A method of generating true random numbers as recited in claim 1, further comprising the source image being a one of a static still photo and a dynamic movie video.

3. A method of generating true random numbers as recited in claim 1, further comprising the choice of categories of images being robust based on DIEHARD, NIST, and ENT criteria.

4. A method of generating true random numbers as recited in claim 1, further comprising applying image processing criteria in order to ensure the appropriateness of the images chosen.

5. A method of generating true random numbers as recited in claim 1, further providing a digital correction of the random bit stream.

6. A method of generating true random numbers as recited in claim 5, further providing applying a von Neumann algorithm to balance the bit stream for frequency counts.

7. A method of generating true random numbers as recited in claim 1, wherein the random number generation can be influenced by user intervention and observation.

8. A method of generating true random numbers as recited in claim 1, further comprising the random number generation used to generate a random seed for a deterministic pseudo-random number generator.

9. A method of generating true random numbers as recited in claim 1, wherein the encoder further comprises the function of creating image type micro-structures.

10. A method of generating true random numbers as recited in claim 1, wherein the encoder is an off-the-shelf portable device and includes at least one of: a computer, an embedded device and a stand-alone unit.

11. A method of generating true random numbers as recited in claim 1, wherein the random bit stream further comprises driving the transmission of secure personal and commercial information using NIST defined security protocols.

12. A method of generating true random numbers as recited in claim 11, wherein the security protocols further include hash functions.

13. A method of generating true random numbers as recited in claim 1, wherein the structure of the source image data further comprises:
   providing an n-dimensional data structure in the form of a cube; and
   sampling x and y image pixels across time (t).

14. A method of generating true random numbers as recited in claim 1, wherein the random bit stream further comprises:
   driving an application used for entertainment and game development; and wherein,
   the user becomes part of the random process by choosing the image source and image category; and wherein,
   the choosing acts as an incentive to enhance the entertainment of game playing.

* * * * *